US012293702B2

(12) United States Patent
Zhang et al.

(10) Patent No.: US 12,293,702 B2
(45) Date of Patent: May 6, 2025

(54) PIXEL CIRCUIT AND DRIVING METHOD THEREFOR, DISPLAY PANEL, AND DISPLAY APPARATUS

(71) Applicant: BOE TECHNOLOGY GROUP CO., LTD., Beijing (CN)

(72) Inventors: Fangzhen Zhang, Beijing (CN); Jing Niu, Beijing (CN); Shuang Sun, Beijing (CN); Zhenyu Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/358,706

(22) Filed: Jul. 25, 2023

(65) Prior Publication Data

US 2023/0402001 A1 Dec. 14, 2023

Related U.S. Application Data

(63) Continuation-in-part of application No. PCT/CN2022/098718, filed on Jun. 14, 2022.

(51) Int. Cl.
*G09G 3/32* (2016.01)

(52) U.S. Cl.
CPC ....... *G09G 3/32* (2013.01); *G09G 2300/0842* (2013.01); *G09G 2330/021* (2013.01)

(58) Field of Classification Search
CPC ... G09G 2300/0819; G09G 2300/0842; G09G 2300/0852; G09G 2300/0861;
(Continued)

(56) References Cited

U.S. PATENT DOCUMENTS 10,390,397 B1 * 8/2019 Chen .................... G09G 3/2011
10,593,271 B1 * 3/2020 Chen ...................... H05B 45/44
(Continued)

FOREIGN PATENT DOCUMENTS

CN 1720567 A 1/2006
CN 101135791 A 3/2008
(Continued)

OTHER PUBLICATIONS

International Search Report and Written Opinion for the PCT Application No. PCT/CN2022/098718 by the International Searching Authority on Mar. 9, 2023.

*Primary Examiner* — Dmitriy Bolotin
(74) *Attorney, Agent, or Firm* — XSENSUS LLP

(57) ABSTRACT

A pixel circuit includes a plurality of driving transistors and a plurality of gating sub-circuits. The plurality of driving transistors are configured to output different driving currents under control of a received control signal. Each gating sub-circuit is electrically connected to a respective selection signal terminal, a scanning signal terminal, a respective driving transistor and a light-emitting device, and is configured to be turned on under control of a scanning signal from the scanning signal terminal and a selection signal from the selection signal terminal to transmit a driving current from the connected driving transistor to the light-emitting device. Within a frame period, one of a plurality of selection signal terminals respectively electrically connected to the plurality of gating sub-circuits outputs a selection signal.

20 Claims, 6 Drawing Sheets

(58) Field of Classification Search
CPC ... G09G 2310/0262; G09G 2320/0233; G09G 2330/021; G09G 3/32; G09G 3/3233
See application file for complete search history.

(56) References Cited

U.S. PATENT DOCUMENTS

| | | | | |
|---|---|---|---|---|
| 10,665,154 | B1 * | 5/2020 | Chen | H10K 59/1213 |
| 10,825,396 | B2 * | 11/2020 | Chen | G09G 3/3258 |
| 11,222,585 | B2 * | 1/2022 | Cai | G09G 3/3233 |
| 2006/0071879 | A1 | 4/2006 | Giraldo et al. | |
| 2007/0164938 | A1 * | 7/2007 | Shin | G09G 3/3233 345/76 |
| 2008/0062112 | A1 | 3/2008 | Umezaki | |
| 2015/0008405 | A1 * | 1/2015 | Kim | G09G 3/3233 257/40 |
| 2016/0189604 | A1 * | 6/2016 | Hu | G09G 3/3225 345/215 |
| 2016/0351096 | A1 * | 12/2016 | Tani | G09G 3/3233 |
| 2017/0110056 | A1 * | 4/2017 | Hu | G09G 3/3258 |
| 2018/0025690 | A1 * | 1/2018 | Bao | G09G 3/3225 345/691 |
| 2018/0182284 | A1 | 6/2018 | Chung | |
| 2018/0240399 | A1 | 8/2018 | Lin et al. | |
| 2020/0074929 | A1 * | 3/2020 | Chen | G09G 3/3258 |
| 2020/0221554 | A1 * | 7/2020 | Chiang | H05B 45/44 |
| 2020/0410926 | A1 | 12/2020 | Li et al. | |
| 2022/0036808 | A1 | 2/2022 | Wu et al. | |
| 2022/0231105 | A1 | 7/2022 | Liu et al. | |
| 2022/0238065 | A1 * | 7/2022 | Liu | G09G 3/3233 |

FOREIGN PATENT DOCUMENTS

| | | | |
|---|---|---|---|
| CN | 102419962 | A | 4/2012 |
| CN | 105513534 | A | 4/2016 |
| CN | 108470536 | A | 8/2018 |
| CN | 110299107 | A | 10/2019 |
| CN | 110491334 | A | 11/2019 |
| CN | 111429834 | A | 7/2020 |
| CN | 111489683 | A | 8/2020 |
| CN | 111799318 | A | 10/2020 |
| CN | 112365836 | A | 2/2021 |
| CN | 113327541 | A | 8/2021 |
| CN | 114446223 | A | 5/2022 |
| WO | 2021147086 | A1 | 7/2021 |

* cited by examiner

PIXEL CIRCUIT AND DRIVING METHOD THEREFOR, DISPLAY PANEL, AND DISPLAY APPARATUS

CROSS-REFERENCE TO RELATED APPLICATION

This application is a Bypass Continuation-in-Part Application of PCT/CN2022/098718, filed on Jun. 14, 2022, which is incorporated herein by reference in their entirety.

TECHNICAL FIELD

The present disclosure relates to the field of display technologies, and in particular, to a pixel circuit and a driving method therefor, a display panel, and a display apparatus.

BACKGROUND

Light emitting diode (LED) display apparatuses have attracted extensive attention due to their active luminescence, wide viewing angle, high contrast, fast response speed, ultra-thin and ultra-light, and other advantages. The display apparatus includes a plurality of pixels, and each pixel includes a pixel circuit and a light-emitting device. The light-emitting device belongs to a current-driven light-emitting display device. Reduction of the power consumption of the display apparatus is a problem that the LED display apparatus need to be solved.

SUMMARY

In an aspect, a pixel circuit is provided. The pixel circuit includes a plurality of driving transistors and a plurality of gating sub-circuits. The plurality of driving transistors are configured to output different driving currents under control of a received control signal. Each gating sub-circuit is electrically connected to a respective selection signal terminal, a scanning signal terminal, a respective driving transistor, and a light-emitting device node. The light-emitting device node is configured to be electrically connected to a light-emitting device. The gating sub-circuit is configured to be turned on under control of a scanning signal from the scanning signal terminal and a selection signal from the selection signal terminal to transmit a driving current from the connected driving transistor to the light-emitting device. Within a frame period, one of a plurality of selection signal terminals respectively electrically connected to the plurality of gating sub-circuits outputs a selection signal.

In some embodiments, channel regions of the plurality of driving transistors have different width-to-length ratios.

In some embodiments, each gating sub-circuit is further electrically connected to a second voltage signal terminal. The gating sub-circuit includes a first transistor, a second transistor and a first capacitor. A control electrode of the first transistor is electrically connected to the scanning signal terminal, a first electrode of the first transistor is electrically connected to the selection signal terminal, and a second electrode of the first transistor is electrically connected to a first node. A control electrode of the second transistor is electrically connected to the first node, a first electrode of the second transistor is electrically connected to the driving transistor, and a second electrode of the second transistor is electrically connected to the light-emitting device node. A first electrode plate of the first capacitor is electrically connected to the first node, and a second electrode plate of the first capacitor is electrically connected to the second voltage signal terminal.

In some embodiments, the pixel circuit further includes a data writing sub-circuit. The data writing sub-circuit is electrically connected to the scanning signal terminal, a data signal terminal and control electrodes of the plurality of driving transistors. The data writing sub-circuit is configured to transmit a data signal from the data signal terminal to the control electrodes of the plurality of driving transistors under control of the scanning signal.

In some embodiments, the data writing sub-circuit includes a third transistor. A control electrode of the third transistor is electrically connected to the scanning signal terminal, a first electrode of the third transistor is electrically connected to the data signal terminal, and a second electrode of the third transistor is electrically connected to the control electrodes of the plurality of driving transistors.

In some embodiments, the pixel circuit further includes a data writing sub-circuit and at least one compensation sub-circuit. The data writing sub-circuit is electrically connected to the scanning signal terminal, a data signal terminal and first electrodes of the plurality of driving transistors, and the data writing sub-circuit is configured to transmit a data signal from the data signal terminal to the first electrodes of the plurality of driving transistors under control of the scanning signal. Each compensation sub-circuit in the at least one compensation sub-circuit is electrically connected to the scanning signal terminal, a second electrode of a driving transistor in the plurality of driving transistors and a control electrode of at least one driving transistor, and the compensation sub-circuit is configured to transmit a voltage signal of the second electrode of the driving transistor to the control electrode of the at least one driving transistor under the control of the scanning signal.

In some embodiments, the at least one compensation sub-circuit includes a single compensation sub-circuit, and the single compensation sub-circuit is electrically connected to the second electrode of the driving transistor in the plurality of driving transistors and a control electrode of each driving transistor. Alternatively, the at least one compensation sub-circuit includes a plurality of compensation sub-circuits, and each compensation sub-circuit is electrically connected to the second electrode of the driving transistor and a control electrode of the driving transistor.

In some embodiments, the data writing sub-circuit includes a fourth transistor. A control electrode of the fourth transistor is electrically connected to the scanning signal terminal, a first electrode of the fourth transistor is electrically connected to the data signal terminal, and a second electrode of the fourth transistor is electrically connected to the first electrodes of the plurality of driving transistors. Each compensation sub-circuit includes a fifth transistor. A control electrode of the fifth transistor is electrically connected to the scanning signal terminal, a first electrode of the fifth transistor is electrically connected to the second electrode of the driving transistor, and a second electrode of the fifth transistor is electrically connected to the control electrode of the at least one driving transistor.

In some embodiments, the sub-pixel further includes a light-emitting control sub-circuit and at least one initialization sub-circuit. The light-emitting control sub-circuit is electrically connected to a light-emitting control signal terminal, a first voltage signal terminal, the plurality of driving transistors and the plurality of gating sub-circuits, and is configured to create a path between each driving transistor and a respective gating sub-circuit under control of a light-emitting control signal from the light-emitting control signal terminal. Each initialization sub-circuit is electrically connected to an initialization signal terminal, a second voltage signal terminal, a control electrode of at least one driving transistor and the light-emitting device node, and is configured to transmit a second voltage signal from the second voltage signal terminal to both a control electrode of the at least one driving transistor and the light-emitting device under control of an initialization signal from the initialization signal terminal.

In some embodiments, the at least one initialization sub-circuit includes a single initialization sub-circuit, and the single initialization sub-circuit is electrically connected to control electrodes of the plurality of driving transistors. Alternatively, the at least one initialization sub-circuit includes a plurality of initialization sub-circuits, and each initialization sub-circuit is electrically connected to a control electrode of a driving transistor.

In some embodiments, the light-emitting control sub-circuit includes a sixth transistor and a plurality of seventh transistors. A control electrode of the sixth transistor is electrically connected to the light-emitting control signal terminal, a first electrode of the sixth transistor is electrically connected to the first voltage signal terminal, and a second electrode of the sixth transistor is electrically connected to first electrodes of the plurality of driving transistors. A control electrode of each seventh transistor is electrically connected to the light-emitting control signal terminal, a first electrode of each seventh transistor is electrically connected to a second electrode of a driving transistor, and a second electrode of each seventh transistor is electrically connected to a gating sub-circuit corresponding to the driving transistor. Each initialization sub-circuit includes an eighth transistor and a ninth transistor. A control electrode of the eighth transistor is electrically connected to the initialization signal terminal, a first electrode of the eighth transistor is electrically connected to the second voltage signal terminal, and a second electrode of the eighth transistor is electrically connected to the control electrode of the at least one driving transistor. A control electrode of the ninth transistor is electrically connected to the initialization signal terminal, a first electrode of the ninth transistor is electrically connected to the second voltage signal terminal, and a second electrode of the ninth transistor is electrically connected to the light-emitting device node.

In some embodiments, the plurality of driving transistors include a first driving transistor and a second driving transistor, and a width-to-length ratio of a channel region of the first driving transistor is greater than a width-to-length ratio of a channel region of the second driving transistor. The plurality of gating sub-circuits include a first gating sub-circuit and a second gating sub-circuit. The first gating sub-circuit is electrically connected to a second electrode of the first driving transistor, and is configured to control the light-emitting device to display a first grayscale in a case where the first gating sub-circuit is turned on. The second gating sub-circuit is electrically connected to a second electrode of the second driving transistor, and is configured to control the light-emitting device to display a second grayscale in a case where the second gating sub-circuit is turned on. The first grayscale is greater than the second grayscale.

In another aspect, a display panel is provided. The display panel includes a plurality of pixel circuits each as described in any of the above embodiments, and a plurality of light-emitting devices. Each light-emitting device is electrically connected to a pixel circuit.

In some embodiments, the pixel circuit includes a first gating sub-circuit and a second gating sub-circuit. At least part of the plurality of light-emitting devices include a first light-emitting sub-device and a second light-emitting sub-device. The first gating sub-circuit is electrically connected to the first light-emitting sub-device, and is configured to control the first light-emitting sub-device to display a first grayscale. The second gating sub-circuit is electrically connected to the second light-emitting sub-device, and is configured to control the second light-emitting sub-device to display a second grayscale.

In some embodiments, the pixel circuit includes a first driving transistor and a second driving transistor, and a width-to-length ratio of a channel region of the first driving transistor is greater than a width-to-length ratio of a channel region of the second driving transistor. The first gating sub-circuit is electrically connected to the first driving transistor, and the second gating sub-circuit is electrically connected to the second driving transistor. An area of a light-emitting region of the first light-emitting sub-device is larger than an area of a light-emitting region of the second light-emitting sub-device.

In some embodiments, the plurality of light-emitting devices include a red light-emitting device, and the red light-emitting device includes the first light-emitting sub-device and the second light-emitting sub-device.

In some embodiments, the plurality of light-emitting devices further includes light-emitting devices for emitting light of other colors. The display panel further includes a plurality of cathode signal lines insulated each other. Light-emitting devices for emitting light of a same color are electrically connected to a cathode signal line, and light-emitting devices for emitting light of different colors are electrically connected to different cathode signal lines.

In some embodiments, the plurality of pixel circuits are arranged in a plurality of columns. The display panel further includes a plurality of selection signal lines. Each selection signal line is electrically connected to a column of pixel circuits, and each column of pixel circuits is electrically connected to at least two selection signal lines. Each selection signal line serves as a selection signal terminal.

In yet another aspect, a display apparatus is provided. The display apparatus includes the display panel as described in any of the above embodiments.

In yet another aspect, a driving method for a pixel circuit is provided, and the driving method is used for driving the pixel circuit as described in any of the above embodiments. A frame period includes a scanning phase. The driving method includes: in the scanning phase, the scanning signal terminal outputting an operating voltage, one of the plurality of selection signal terminals respectively electrically connected to the plurality of gating sub-circuits outputting an operating voltage, and the remaining selection signal terminals outputting turn-off voltages.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, but are not limitations on an actual size of a product, an actual process of a method and an actual timing of a signal to which the embodiments of the present disclosure relate.

DETAILED DESCRIPTION

Figure 1:
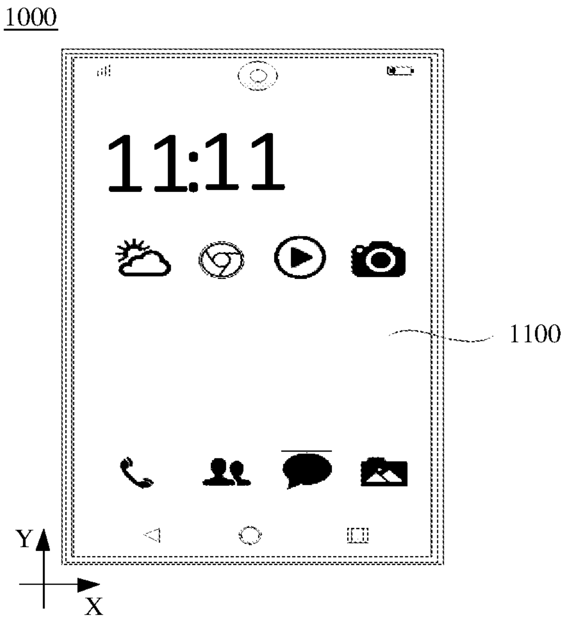
FIG. 1 is a structural diagram of a display apparatus, in accordance with some embodiments.

Technical solutions in some embodiments of the present disclosure will be described clearly and completely with reference to the accompanying drawings below. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as open and inclusive, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics described herein may be included in any one or more embodiments or examples in any suitable manner.

Hereinafter, the terms such as "first" and "second" are used for descriptive purposes only, and are not to be construed as indicating or implying the relative importance or implicitly indicating the number of indicated technical features. Thus, features defined with "first" or "second" may explicitly or implicitly include one or more of the features. In the description of the embodiments of the present disclosure, term "a plurality of" or "the plurality of" means two or more unless otherwise specified.

The phrase "at least one of A, B and C" has a same meaning as the phrase "at least one of A, B or C", and they both include the following combinations of A, B and C: only A, only B, only C, a combination of A and B, a combination of A and C, a combination of B and C, and a combination of A, B and C.

The phrase "applicable to" or "configured to" as used herein indicates an open and inclusive expression, which does not exclude apparatuses that are applicable to or configured to perform additional tasks or steps.

In addition, the use of the phrase "based on" is meant to be open and inclusive, since a process, step, calculation or other action that is "based on" one or more of the stated conditions or values may, in practice, be based on additional conditions or values exceeding those stated.

The transistors used in all embodiments of the present disclosure may be thin film transistors (TFTs), field effect transistors (such as metal oxide semiconductor (MOS) transistors), or other devices with the same characteristics. The embodiments of the present disclosure do not limit thereto.

For example, the transistors may be TFTs. The TFT may be manufactured by using an amorphous silicon (a-Si) process, an oxide semiconductor process, a low temperature poly-silicon (LTPS) process, or a high temperature poly-silicon (HTPS) process. The embodiments of the present disclosure do not limit thereto.

The types of the transistors are not limited in the embodiments of the present disclosure. The transistors may be N-type transistors or P-type transistors. The transistors may also be enhancement transistors or depletion transistors. The embodiments of the present disclosure are illustrated by considering all transistors as P-type transistors. The P-type transistor is turned on due to the action of a low-level voltage signal, and turned off due to the action of a high-level voltage signal; that is, the operating voltage of the P-type transistor is a low-level voltage, and the off-voltage of the P-type transistor is a high-level voltage.

In the embodiments of the present disclosure, the gate of the transistor is the control electrode. Moreover, in order to distinguish the two electrodes of the transistor except the gate, it is directly described that one of the two electrodes is the first electrode and the other thereof is the second electrode. In this case, the first electrode of the transistor may be one of source and drain of the transistor, and the second electrode of the transistor may be the other of the source and the drain of the transistor. Since the source and the drain of the transistor may be symmetrical in structure, there may be no difference in structure between the source and the drain of the transistor.

The capacitor in the embodiments of the present disclosure capacitor may be a capacitor device manufactured separately through a process. For example, the capacitor device is realized by manufacturing specialized capacitor electrodes, and each capacitor electrode (a first electrode plate and a second electrode plate) of the capacitor may be implemented by a metal layer, a semiconductor layer (e.g., doped polysilicon), or the like. The capacitor may alternatively be a parasitic capacitor between transistors, or implemented by the transistors and other devices or by the transistors and lines, or implemented by using the parasitic capacitor between lines of the circuit itself.

Each of the above-mentioned transistors may further include at least one switch transistor connected in parallel with each transistor. The embodiments of the present disclosure are merely examples of pixel circuits and gate driver circuits. Other structures having the same function as the pixel circuits and gate driver circuits are not provided herein again, but shall be included in the protection scope of the present disclosure.

In the embodiments of the present disclosure, nodes such as a first node and a second node do not represent actual components, but represent junctions of related electrical connections in a circuit diagram. That is, these nodes are nodes equivalent to the junctions of the related electrical connections in the circuit diagram.

Some embodiments of the present disclosure provide a display apparatus. Referring to FIG. 1, FIG. 1 is a structural diagram of a display apparatus 1000 (e.g., a mobile phone), the display apparatus 1000 may be any apparatus that displays images whether in motion (e.g., a video) or fixed (e.g., a still image), and regardless of text or image.

For example, the display apparatus 1000 may be any product or component with display function, such as a television (TV), a notebook computer, a tablet computer, a mobile phone, a personal digital assistant (PDA), a navigator, a wearable device, an augmented reality (AR) device, a virtual reality (VR) device, or the like.

In some embodiments, the display apparatus 1000 may be an electroluminescence display apparatus or a photoluminescence display apparatus. In a case where the display apparatus is the electroluminescence display apparatus, the electroluminescence display apparatus may be an organic light emitting diode (OLED) display apparatus or a quantum dot light emitting diode (QLED) display apparatus. In a case where the display apparatus is a photoluminescence display apparatus, the photoluminescence display apparatus may be a quantum dot photoluminescence display apparatus. In addition, the display apparatus may alternatively be a mini LED display apparatus or a micro LED display apparatus. The embodiments of the present disclosure do not specifically limit this.

Figure 2:
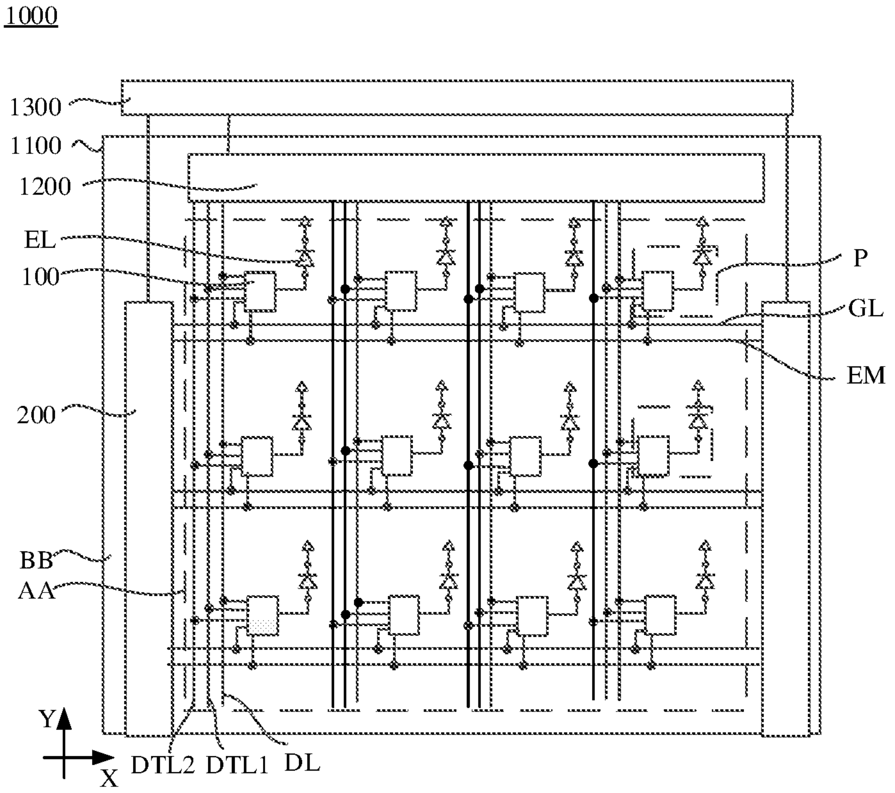
FIG. 2 is a structural diagram of a display panel, in accordance with some embodiments.

In some embodiments, referring to FIG. 2, the display apparatus 1000 may include a display panel 1100, a driver chip (source driver integrated circuit, SD IC) 1200 disposed on the display panel 1100, and a driver circuit board 1300 (source printed circuit board, S PCB) electrically connected to the display panel 1100. The driver chip 1200 may be a data driving circuit, and the driver circuit board 1300 may include driving circuits such as a timing controller (TCON) (not shown in the figure), a power management chip DC/DC (not shown in the figure) and an adjustable resistor voltage divider circuit (for generating Vcom) (not shown in the figure).

The display panel 1100 includes a display region AA and a peripheral region BB located on at least one side of the display region AA. FIG. 2 shows an example where the peripheral region S surrounds the display region AA.

The display region AA may include a plurality of sub-pixels P. The plurality of sub-pixels P are arranged in a plurality of rows and a plurality of columns, each row includes multiple sub-pixels P arranged in the first direction X (a horizontal direction in FIG. 2), and each column includes multiple sub-pixels P arranged in the second direction (a vertical direction in FIG. 2). Each sub-pixel P includes a pixel circuit 100 and a light-emitting device EL.

Reducing the power consumption of the pixel circuit 100 and increasing the proportion of power consumption of the light-emitting device EL are currently a main research direction in reducing the power consumption of the display panel 1100. However, in the related art, the pixel circuit 100 includes at least one driving transistor. During the operation of the display panel 1100, the pixel circuit 100 outputs a driving current to the light-emitting device EL according to the voltage applied to the driving transistor, so as to make the light-emitting device EL emit light. Limited by the voltage control accuracy of the driver chip 1200, the adjustment range of the voltage on the driving transistor in the pixel circuit 100 cannot be reduced without limitation, and the voltage division of the driving transistor cannot be further reduced, so that the proportion of the power consumption of the pixel circuit 100 cannot be further reduced.

For example, the voltage control accuracy of the driver chip 1200 is 10 mV (millivolts). The sub-pixel P is designed to display 256 grayscales. In this way, the adjustment range of the voltage on the control electrode of the driving transistor is not lower than (256×10) mV, which is equal to 2.56 V. The voltage division of the driving transistor is relatively large, resulting in a high proportion of the power consumption of the pixel circuit 100 (relative to the overall power consumption of the display panel 1100), which is not conducive to reducing the power consumption of the display panel 1100.

Figure 3:
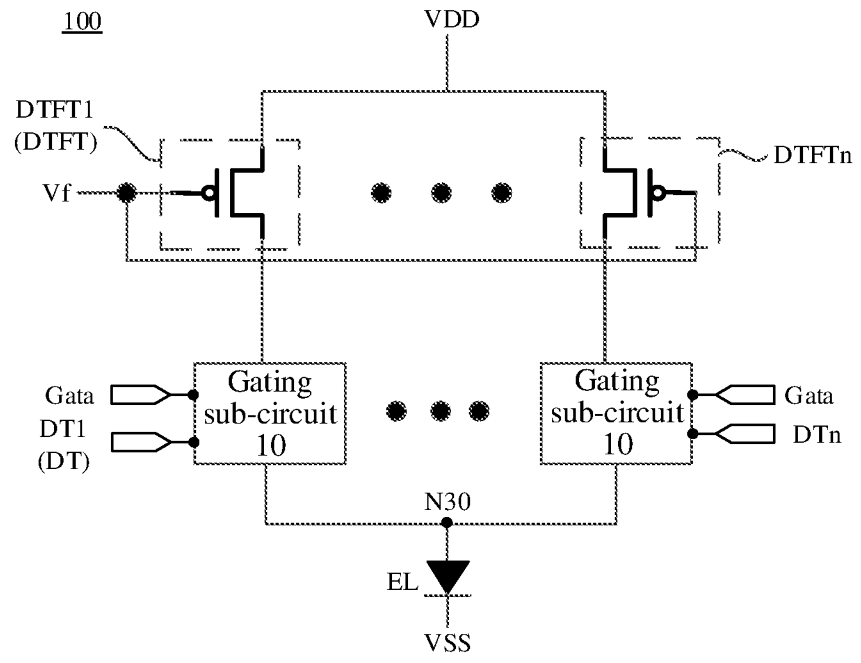
FIG. 3 is a structural diagram of a sub-pixel, in accordance with some embodiments.

Control electrodes of the plurality of driving transistors DTFT may receive a control signal. The plurality of driving transistors DTFT are configured to output different driving currents under control of the control signal. That is, the plurality of driving transistors DTFT have different current output capabilities, and under the control of the same control signal, each driving transistor DTFT outputs a different driving current. FIG. 3 only exemplarily shows two driving transistors. Moreover, in order to distinguish the plurality of driving transistors DTFT, the plurality of driving transistors DTFT are sequentially numbered as DTFT1, DTFT2, . . . , DTFTn in numerical order.

It can be understood that "the plurality of driving transistors DTFT" hereinafter refer to all driving transistors DTFT included in the pixel circuit 100.

In some embodiments, the channel regions of the plurality of driving transistors DTFT have different width-to-length ratios (W/L). That is, for the formed driving transistors DTFT, the ratios of the channel widths to the channel lengths are different. The larger the width-to-length ratio of the channel region of the driving transistor DTFT, the greater the current output capability. That is, the output driving current is larger under the control of the same control signal.

In the plurality of gating sub-circuits 10, each gating sub-circuit 10 is electrically connected to a selection signal terminal DT, a scanning signal terminal Gata, a driving transistor DTFT and a light-emitting device node N30. The light-emitting device node N30 is electrically connected to a light-emitting device EL, so that each gating sub-circuit 10 is also electrically connected to the light-emitting device EL. The gating sub-circuit is configured to be turned on under control of a scan signal from the scanning signal terminal Gata and a selection signal from the selection signal terminal DT to transmit the driving current from the connected driving transistor DTFT to the light-emitting device EL. Within a frame period, one of a plurality of selection signal terminals DT electrically connected to the plurality of gating sub-circuits 10 outputs a selection signal.

For example, as shown in FIG. 2, the display panel 1100 further includes a gate drive circuit 200 located in the peripheral region, and a plurality of gate lines GL. The gate drive circuit 200 is electrically connected to a row of pixel circuits 100 through at least one gate line GL, and each gate line GL serves as a scanning signal terminal Gata of a pixel circuit 100.

In the pixel circuit 100 provided by the embodiments of the present disclosure, when the control electrodes of the plurality of driving transistors DTFT receive the same control signal, the plurality of driving transistors DTFT may output a plurality of different driving currents. By controlling different selection signal terminals to output selection signals, the above-mentioned different driving currents may be input to the light-emitting device EL, and in a case where different gating sub-circuits 10 are turned on, the light-emitting device EL may display different grayscales. That is, the pixel circuit 100 can drive the light-emitting device EL to display different grayscales under the control of the same control signal and different selection signals. Based on this, without changing the voltage control accuracy of the driver chip and the display grayscale range of the light-emitting device, the adjustment range (voltage adjustment range) of the control signal of the control electrode of the driving transistor DTFT may be reduced. Thus, the voltage division of the driving transistor DTFT in the pixel circuit 100 may be reduced, the proportion of the power consumption of the pixel circuit 100 may be reduced, the power consumption of the pixel circuit 100 may be reduced, and the power consumption of the display panel 1100 and the power consumption of the display apparatus 1000 may be reduced.

For example, the pixel circuit 100 includes two driving transistors DTFT and two gating sub-circuits 10. The two driving transistors DTFT may drive the light-emitting device EL to realize the display of two grayscales through the two gating sub-circuits 10 under the control of a control signal (voltage signal). For example, the voltage control accuracy of the driver chip is 10 mV (millivolts), and the sub-pixel is designed to display 256 grayscales, then the minimum adjustment range of the voltage on the control electrodes of the two driving transistors DTFT may be ((256/2)×10 mV), which is equal to 1.28 V.

Figure 4:
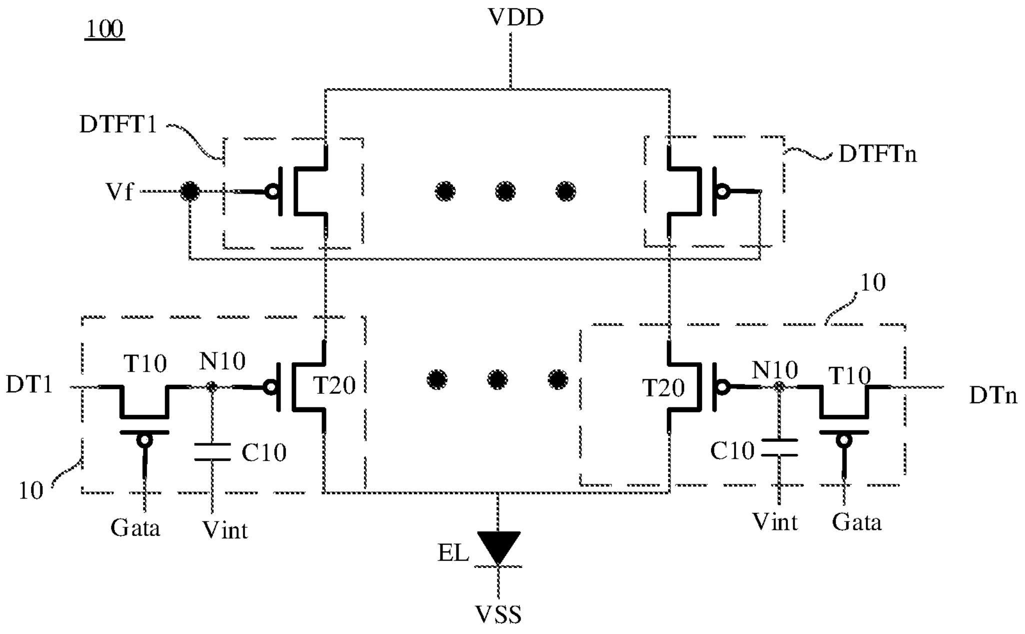
FIG. 4 is a structural diagram of another pixel circuit, in accordance with some embodiments.

For example, as shown in FIG. 4, the gating sub-circuit 10 includes a first transistor T10, a second transistor T20, and a first capacitor C10. A control electrode of the first transistor T10 is electrically connected to a scanning signal terminal Gata, a first electrode thereof is electrically connected to a selection signal terminal DT (a first selection signal terminal DT1), and a second electrode thereof is electrically connected to a first node N10. The first transistor T10 is configured to transmit a selection signal from the selection signal terminal DT to the first node N10 under the control of a scan signal from the scanning signal terminal.

A control electrode of the second transistor T20 is electrically connected to the first node N10, a first electrode thereof is electrically connected to a driving transistor DTFT, and a second electrode thereof is electrically connected to the light-emitting device EL. The second transistor T20 is configured to transmit the driving current from the driving transistor DTFT to the light-emitting device EL under the control of the voltage of the first node N10.

A first electrode plate of the first capacitor C10 is electrically connected to the first node N10, and a second electrode plate thereof is electrically connected to a second voltage signal terminal Vint. The first capacitor C10 is configured to maintain the voltage of the first node N10.

The threshold voltage Vth may drift during the operation of the driving transistor DTFT. Therefore, the threshold voltage of the pixel circuit 100 needs to be compensated. Common pixel circuit compensation methods include an external compensation method and an internal compensation method. It can be understood that the two compensation methods are conventional techniques in the art, and details are not introduced excessively in the embodiments of the present disclosure.

Figure 5:
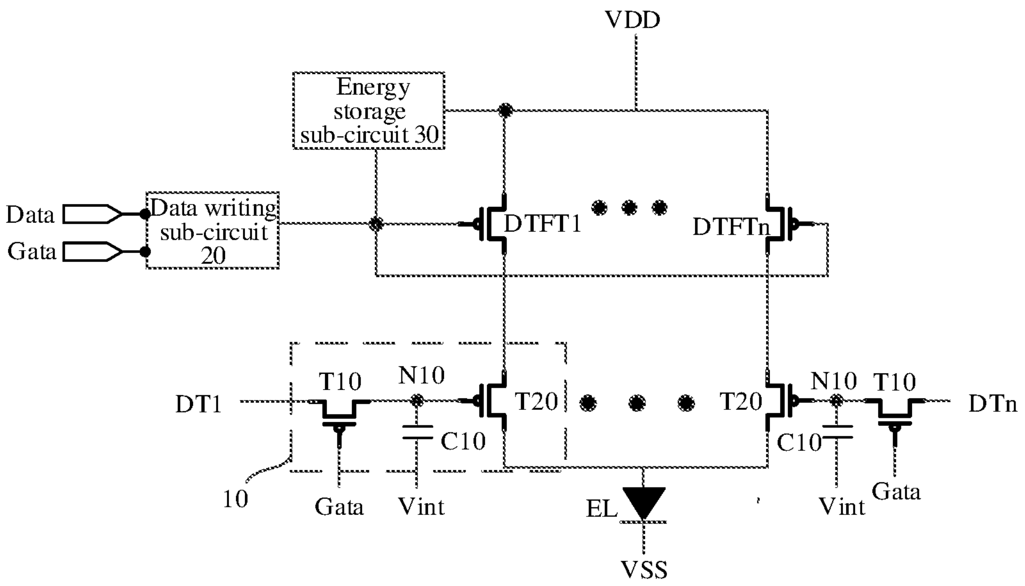
FIG. 5 is a structural diagram of yet another pixel circuit, in accordance with some embodiments.

In some embodiments, in a case where the pixel circuit 100 adopts the external compensation method, referring to FIG. 5, the pixel circuit 100 may further include a data writing sub-circuit 20. The data writing sub-circuit 20 is electrically connected to the scanning signal terminal Gata, a data signal terminal Data, and the control electrodes of the plurality of driving transistors DTFT. The data writing sub-circuit 20 is configured to transmit a data signal from the data signal terminal to the control electrodes of the driving transistors under the control of the scan signal from the scanning signal terminal Gata. In this way, the control signals received by the control electrodes of the plurality of driving transistors DTFT are the data signal input from the data signal terminal Data. According to the signal written into the control electrode of the driving transistor DTFT by the data signal terminal Data, the driving transistor DTFT outputs a corresponding driving current, thereby realizing full grayscale display.

The data writing sub-circuit 20 is electrically connected to the control electrodes of the plurality of driving transistors DTFT, which may be understood as the control electrodes of the plurality of driving transistors DTFT are electrically connected to each other. In this way, the data writing sub-circuit 20 may synchronously transmit the data signal to the control electrodes of the plurality of driving transistors DTFT in the scanning phase T2 (see below).

Figure 6:
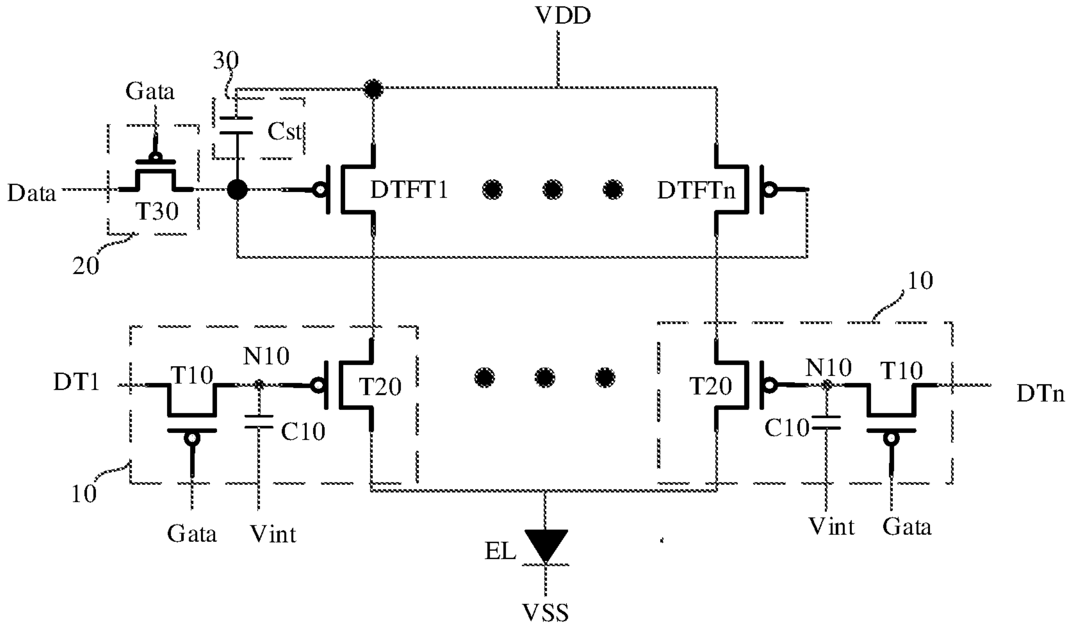
FIG. 6 is a structural diagram of yet another pixel circuit, in accordance with some embodiments.

Referring to FIG. 6, the data writing sub-circuit 20 may include a third transistor T30. A control electrode of the third transistor T30 is electrically connected to the scanning signal terminal Gata, a first electrode thereof is electrically connected to the data signal terminal Data, and a second electrode thereof is electrically connected to the control electrodes of the plurality of driving transistors DTFT. The third transistor T30 is configured to transmit the data signal from the data signal terminal Data to the control electrodes of the plurality of driving transistors DTFT under the control the scanning signal from the scanning signal terminal Gata.

In some embodiments, referring to FIG. 5, the pixel circuit 100 may further include an energy storage sub-circuit 30. The energy storage sub-circuit 30 is electrically connected to the control electrodes of the plurality of driving transistors DTFT and a first voltage signal terminal VDD, and is configured to maintain potentials of the control electrodes of the plurality of driving transistors DTFT, so as to reduce the risk of electric leakage of the control electrodes of the driving transistors DTFT. The first voltage signal terminal VDD may be a power supply voltage signal terminal and is used for transmitting a power supply voltage signal to the first electrodes of the driving transistors DTFT.

In some embodiments, referring to FIG. 6, the energy storage sub-circuit 30 includes a storage capacitor Cst. One electrode plate of the storage capacitor Cst is electrically connected to the control electrodes of the plurality of driving transistors DTFT, and the other electrode plate thereof is electrically connected to the first voltage signal terminal.

Figure 7:
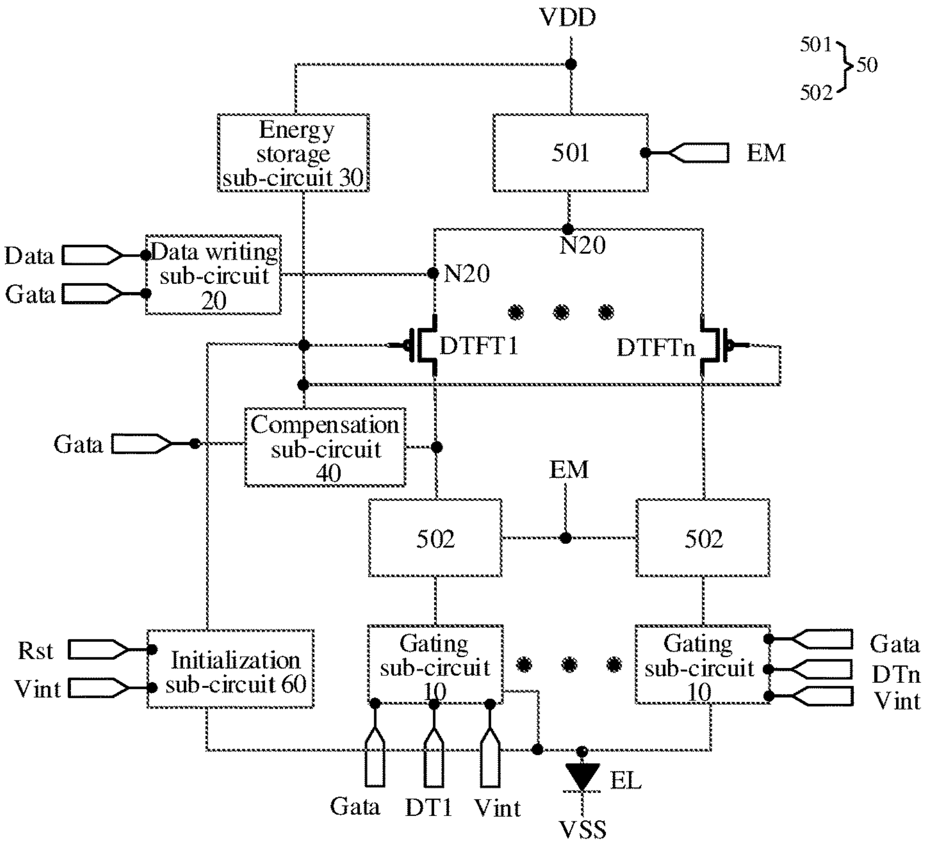
FIG. 7 is a structural diagram of yet another pixel circuit, in accordance with some embodiments.

In some embodiments, in a case where the pixel circuit 100 adopts the internal compensation method, referring to FIG. 7, the pixel circuit 100 may further include a data writing sub-circuit 20 and at least one compensation sub-circuit 40. The pixel circuit 100 in FIG. 7 includes a single compensation sub-circuit 40. In this case, a voltage of the control signal received by the control electrode of the driving transistor DTFT may be a sum of a voltage of the data signal (Vdata) and the threshold voltage of the driving transistor (Vth).

The data writing sub-circuit 20 is electrically connected to the scanning signal terminal Gata, the data signal terminal Data, and the first electrodes of the plurality of driving transistors DTFT. The data writing sub-circuit 20 is configured to transmit the data signal from the data signal terminal Data to the first electrodes of the plurality of driving transistors DTFT (a second node N20) under the control of the scan signal from the scanning signal terminal Gata.

Figure 8:
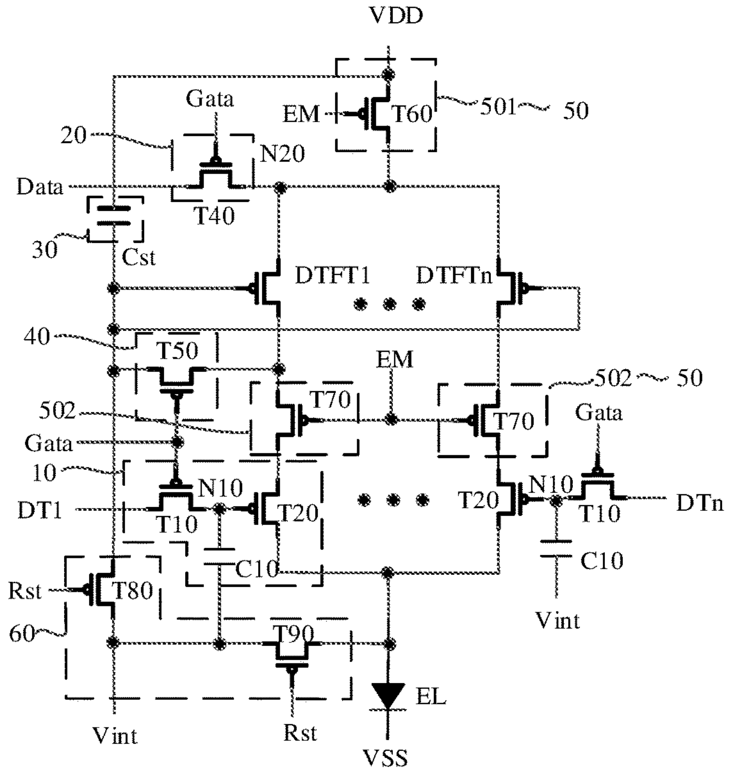
FIG. 8 is a structural diagram of yet another pixel circuit, in accordance with some embodiments.

For example, referring to FIG. 8, the data writing sub-circuit 20 may include a fourth transistor T40. A control electrode of the fourth transistor T40 is electrically connected to the scanning signal terminal Gata, a first electrode thereof is electrically connected to the data signal terminal Data, and a second electrode thereof is electrically connected to the first electrodes of the plurality of driving transistors DTFT.

Each compensation sub-circuit in the at least one compensation sub-circuit 40 is electrically connected to the scanning signal terminal Gata, a second electrode of a driving transistor DTFT, and a control electrode of at least one driving transistor DTFT, and is configured to transmit a voltage signal of the second electrode of the driving transistor DTFT to the control electrode of the at least one driving transistor DTFT under the control the scanning signal from the scanning signal terminal Gata.

It can be understood that although the channel regions of the width-to-length ratios (W/L) of the plurality of driving transistors DTFT are different, the threshold voltages Vth of the plurality of driving transistors DTFT may be equal or unequal. Therefore, in a case where the threshold voltages Vth of the plurality of driving transistors DTFT are equal, the threshold voltages of the plurality of driving transistors DTFT may be compensated by one or more compensation sub-circuits 40; and in a case where the threshold voltages Vth of the plurality of driving transistors DTFT are unequal, the threshold voltages of the plurality of driving transistors DTFT may be compensated respectively through a plurality of compensation sub-circuits 40.

For example, in a case where the threshold voltages Vth of the plurality of driving transistors DTFT are equal, and the pixel circuit 100 includes a single compensation sub-circuit 40, referring to FIGS. 7 and 8, the compensation sub-circuit 40 is electrically connected to a second electrode of one of the plurality of driving transistors DTFT and a control electrode of each driving transistor DTFT.

Figure 9:
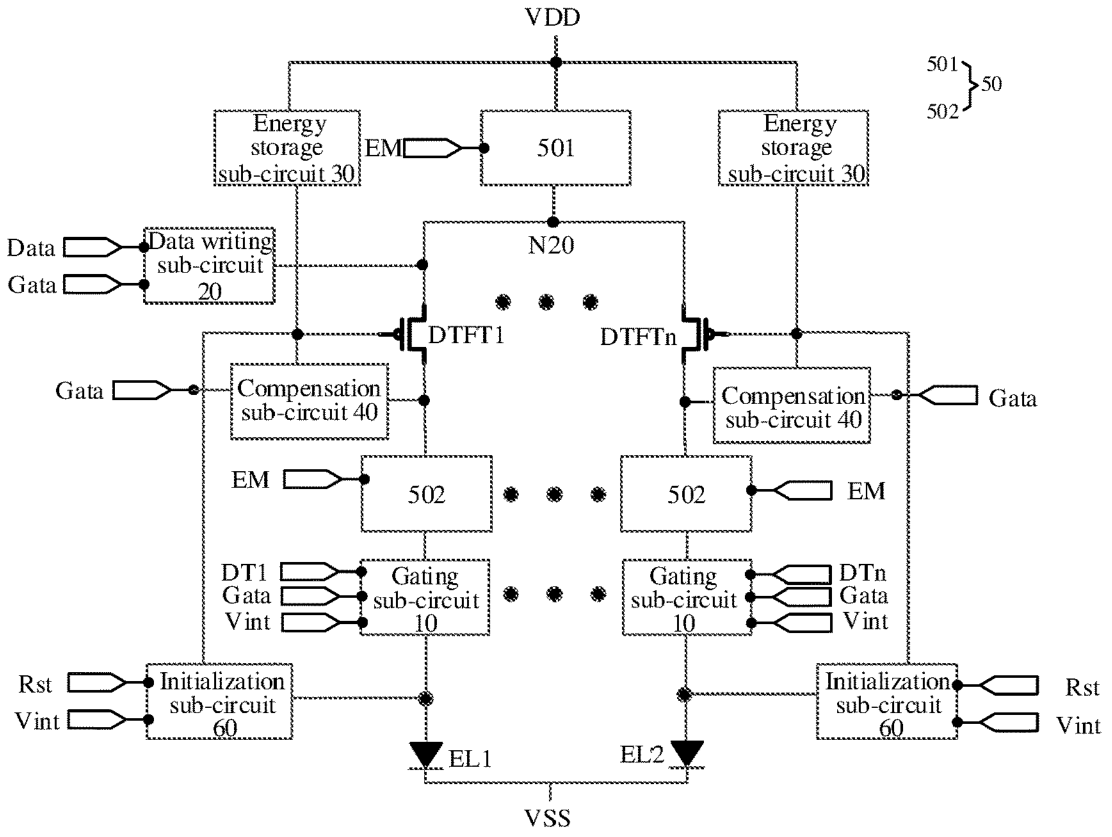
FIG. 9 is a structural diagram of yet another pixel circuit, in accordance with some embodiments.
Figure 10:
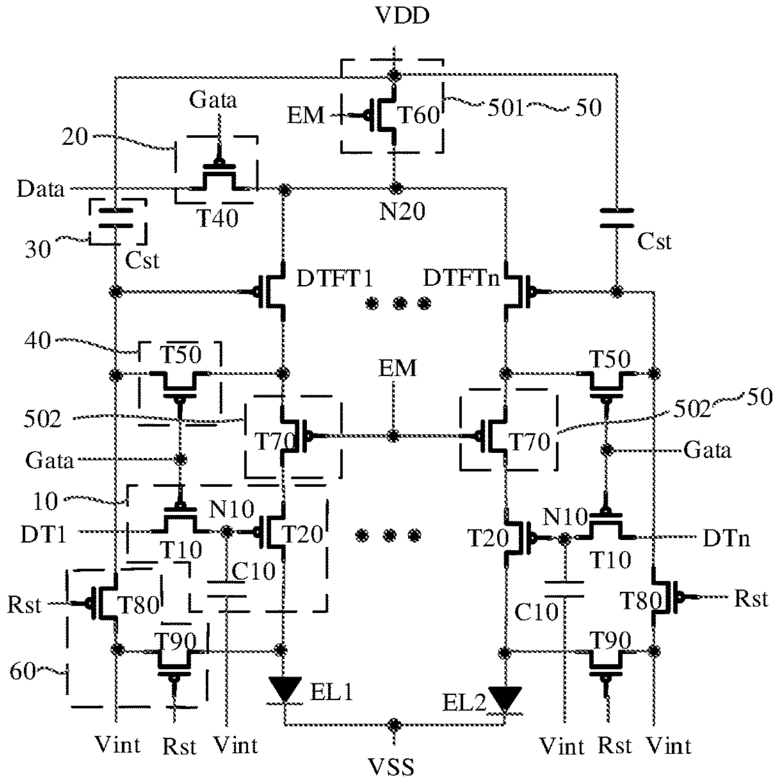
FIG. 10 is a structural diagram of yet another pixel circuit, in accordance with some embodiments.

For example, in a case where the threshold voltages Vth of the plurality of driving transistors DTFT are not equal, and the pixel circuit 100 includes the plurality of compensation sub-circuits 40, referring to FIGS. 9 and 10, the number of the plurality of compensation sub-circuits 40 may be the same as the number of the driving transistors DTFT, and each compensation sub-circuit 40 corresponds to a driving transistor DTFT. Each compensation sub-circuit 40 is electrically connected to a second electrode and a control electrode of the corresponding driving transistor DTFT.

The compensation sub-circuit 40 includes a fifth transistor T50. A control electrode of the fifth transistor T50 is electrically connected to the scanning signal terminal Gata, a first electrode is electrically connected to a second electrode of a driving transistor DTFT, and a second electrode is electrically connected to a control electrode of at least one driving transistor DTFT.

For example, in the case where the pixel circuit 100 includes a single compensation sub-circuit 40, referring to FIG. 8, the pixel circuit 100 may include a single fifth transistor T50. The control electrode of the fifth transistor T50 is electrically connected to the scanning signal terminal Gata, the first electrode thereof is electrically connected to the second electrode of one of the plurality of driving transistors DTFT, and the second electrode thereof is electrically connected to the control electrode of each of the plurality of driving transistors DTFT.

Based on this, the control electrodes of the plurality of driving transistors DTFT are electrically connected to each other. In this way, the data signal written into the second node N20 by the data writing sub-circuit 20 is transmitted to the second electrodes of the plurality of driving transistors DTFT. Since the threshold voltages Vth of the plurality of driving transistors DTFT are equal, the voltages transmitted to the second electrodes of the plurality of driving transistors DTFT are equal, and they are all a sum of a voltage of the data signal (Vdata) and the threshold voltage (Vth). Then, the voltage of the second electrode of one of the driving transistors DTFT is transmitted to the control electrodes of the plurality of driving transistors DTFT through the fifth transistor T50, and the voltage transmitted to the control electrodes of the plurality of driving transistors DTFT are a sum of Vdata and Vth (Vdata+Vth). That is, the data signal and the threshold voltage of the driving transistor DTFT are written into the control electrodes of the plurality of driving transistors DTFT through the fifth transistor T50.

For example, in the case where the pixel circuit 100 includes the plurality of compensation sub-circuits 40, referring to FIGS. 9 and 10, the pixel circuit 100 includes a plurality of fifth transistors T50. Each fifth transistor T50 corresponds to a driving transistor DTFT. The control electrode of each fifth transistor T50 is electrically connected to the scanning signal terminal Gata, the first electrode thereof is electrically connected to the second electrode of the corresponding driving transistor DTFT, and the second electrode thereof is electrically connected to the control electrode of the corresponding driving transistor DTFT.

In some embodiments, referring to FIGS. 7 to 10, the pixel circuit 100 further includes at least one energy storage sub-circuit 30, a light-emitting control sub-circuit 50 and at least one initialization sub-circuit 60.

As shown in FIGS. 7 and 8, the pixel circuit 100 includes a single energy storage sub-circuit 30. The energy storage sub-circuit 30 is electrically connected to the control electrodes of the plurality of driving transistors DTFT and the first voltage signal terminal VDD, and is configured to maintain the voltages of the control electrodes of the driving transistors DTFT, so as to reduce the electric leakage current of the control electrodes of the driving transistors DTFT.

For example, referring to FIG. 8, the energy storage sub-circuit 30 includes an energy storage capacitor Cst. One electrode plate of the energy storage capacitor Cst is electrically connected to the first voltage signal terminal VDD, and the other electrode plate is electrically connected to the control electrodes of the plurality of driving transistors DTFT.

It can be understood that, referring to FIGS. 9 and 10, in the case where the pixel circuit 100 includes the plurality of compensation sub-circuits 40, the pixel circuit 100 may include a plurality of energy storage sub-circuits 30, and each energy storage sub-circuit 30 corresponds to a driving transistor DTFT. That is, each energy storage sub-circuit 30 is electrically connected to a control electrode of a driving transistor DTFT and the first voltage signal terminal VDD.

Referring to FIGS. 7 and 9, the light-emitting control sub-circuit 50 is electrically connected to a light-emitting control signal terminal EM, the plurality of driving transistors DTFT and the plurality of gating sub-circuits 10, and is configured to make the pixel circuit 100 turned on (i.e., create a path between each gating sub-circuit 10 and a respective driving transistor DTFT) under the control of the light-emitting control signal from the light-emitting control signal terminal EM. For example, referring to FIG. 2, the display panel includes a plurality of light-emitting control signal lines, and each light-emitting control signal line serves as a light-emitting control signal terminal. It will be noted that a plurality of portions 501 and 502 in FIGS. 7 to 10 constitute the light-emitting control sub-circuit 50 together.

For example, referring to FIGS. 8 and 10, the light-emitting control sub-circuit 50 includes a sixth transistor T60 and a plurality of seventh transistors T70. A control electrode of the sixth transistor T60 is electrically connected to the light-emitting control signal terminal EM, a first electrode thereof is electrically connected to the first voltage signal terminal VDD, and a second electrode thereof is electrically connected to the first electrodes of the plurality of driving transistors DTFT. A control electrode of each seventh transistor T70 is electrically connected to the light-emitting control signal terminal EM, a first electrode thereof is electrically connected to a second electrode of a driving transistor DTFT, and a second electrode thereof is electrically connected to a gating sub-circuit 10 (the first electrode of the second transistor T20).

For example, as shown in FIG. 10, the light-emitting control sub-circuit 50 includes the plurality of seventh transistors T70, the first electrode of each seventh transistor T70 is electrically connected to a second electrode of a driving transistor DTFT, and the second electrode of each seventh transistor T70 is electrically connected to a first electrode of a second transistor T20.

In some embodiments, referring to FIGS. 7 and 9, the initialization sub-circuit 60 is electrically connected to an initialization signal terminal Rst, the second voltage signal terminal Vint, a control electrode of at least one driving transistor DTFT, and the light-emitting device EL (an anode thereof), and is configured to transmit a second voltage signal from the second voltage signal terminal Vint to both the control electrode of the at least one driving transistor and the light-emitting device under the control of an initialization signal from the initialization signal terminal Rst.

In some examples, referring to FIGS. 7 and 8, the pixel circuit 100 includes a single initialization sub-circuit 60. The initialization sub-circuit 60 is electrically connected to the initialization signal terminal Rst, the second voltage signal terminal Vint, the control electrodes of the plurality of driving transistors DTFT, and the light-emitting device EL, and is configured to transmit a second voltage signal from the second voltage signal terminal Vint to both the control electrodes of the plurality of driving transistors and the light-emitting device under the control of the initialization signal from the initialization signal terminal Rst.

For example, referring to FIG. 8, the initialization sub-circuit 60 may include an eighth transistor T80 and a ninth transistor T90. A control electrode of the eighth transistor T80 is electrically connected to the initialization signal terminal Rst, a first electrode thereof is electrically connected to the second voltage signal terminal Vint, and a second electrode thereof is electrically connected to the control electrodes of the plurality of driving transistors DTFT, and is configured to transmit the second voltage signal from the second voltage signal terminal Vint to the control electrodes of the plurality of driving transistors DTFT under the control of the initialization signal from the initialization signal terminal Rst. A control electrode of the ninth transistor T90 is electrically connected to the initialization signal terminal Rst, a first electrode thereof is electrically connected to the second voltage signal terminal Vint, and a second electrode thereof is electrically connected to the anode of the light-emitting device EL, and is configured to transmit the second voltage signal from the second voltage signal terminal Vint to the anode of the light-emitting device EL under the control of the initialization signal from the initialization signal terminal Rst.

It can be understood that, referring to FIGS. 9 and 10, the pixel circuit 100 may include a plurality of initialization sub-circuits 60, and each initialization sub-circuit 60 corresponds to a driving transistor DTFT. That is, each initialization sub-circuit 60 is electrically connected to the initialization signal terminal Rst, the second voltage signal terminal Vint, a control electrode of a driving transistor DTFT, and the light-emitting device EL (the anode thereof).

Figure 11:
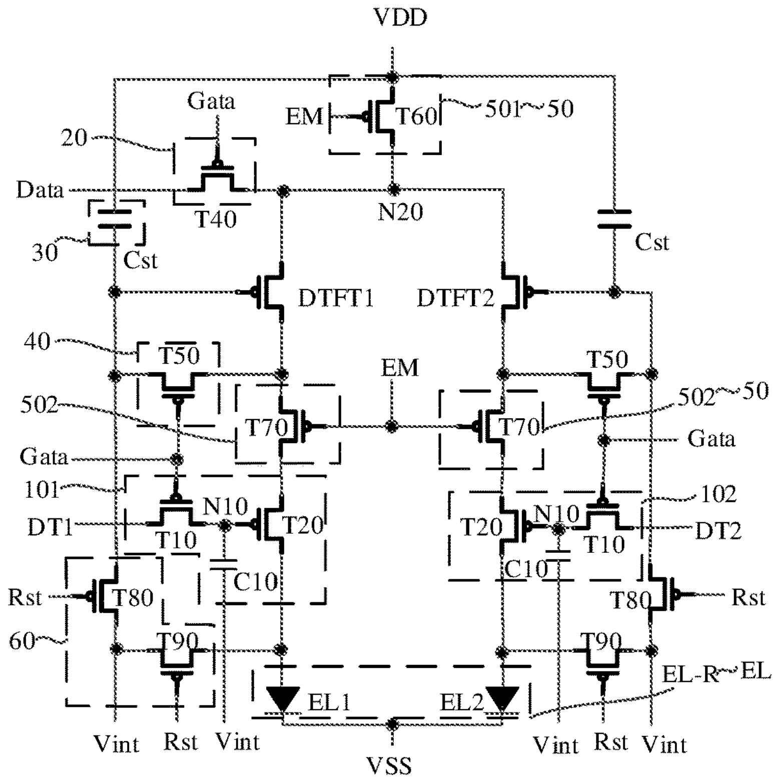
FIG. 11 is a structural diagram of yet another pixel circuit, in accordance with some embodiments.

In some embodiments, referring to FIG. 11, FIG. 11 shows an embodiment of the present disclosure by considering an example where the pixel circuit 100 includes two driving transistors DTFT and two gating sub-circuits 10. The plurality of driving transistors DTFT includes a first driving transistor DTFT1 and a second driving transistor DTFT2. A width-to-length ratio of a channel region of the first driving transistor DTFT is greater than a width-to-length ratio of a channel region of the second driving transistor DTFT2, that is, an on-state current of the first driving transistor DTFT is greater than an on-state current of the second driving transistor DTFT.

The plurality of gating sub-circuits 10 include a first gating sub-circuit 101 and a second gating sub-circuit 102. The first gating sub-circuit 101 is electrically connected to the first selection signal terminal DT1, the scanning signal terminal Gata, and the second electrode of the first driving transistor DTFT1, and is configured to be turned on under the control of the scanning signal from the scanning signal terminal Gata and the first selection signal from the first selection signal terminal DT1 to transmit the driving current output by the first driving transistor DTFT1 to the light-emitting device EL, so as to control the light-emitting device EL to display a first grayscale. The second gating sub-circuit 102 is electrically connected to the second selection signal terminal DT2, the scanning signal terminal Gata, and the second electrode of the second driving transistor DTFT2, and is configured to be turned on under the control of the scanning signal from the scanning signal terminal Gata and the second selection signal from the second selection signal terminal DT2 to transmit the driving current output by the second driving transistor DTFT2 to the light-emitting device EL, so as to control the light-emitting device EL to display a second grayscale. The first grayscale is greater than the second grayscale.

It can be understood that the above embodiment is a specific embodiment, but not the only embodiment. For example, the pixel circuit 100 may include three, four or more driving transistors DTFT. The two driving transistors DTFT are beneficial to reducing the size of the pixel circuit 100 and increasing the pixel density of the display panel.

The following embodiments of the present disclosure will be described in the example where the pixel circuit 100 includes the first driving transistor DTFT1, the second driving transistor DTFT2, the first gating sub-circuit 101 and the second gating sub-circuit 102.

In some embodiments, referring to FIG. 11, at least part of light-emitting devices EL in a plurality of light-emitting devices EL include a first light-emitting sub-device EL1 and a second light-emitting sub-device EL2. The first gating sub-circuit 101 is electrically connected to the first light-emitting sub-device EL1, and is configured to control the first light-emitting sub-device EL1 to display the first grayscale. The second gating sub-circuit 102 is electrically connected to the second light-emitting sub-device EL2, and is configured to control the second light-emitting sub-device EL2 to display the second grayscale. In this way, the first light-emitting sub-device EL1 and the second light-emitting sub-device EL2 may respectively display a high grayscale and a low grayscale, thereby reducing the risk of short-term afterimages caused by the junction temperature rise of the light-emitting device, and improving the display effect of the display panel 1100.

It can be understood that the light-emitting device EL is a current-driven light emitting element. After the light-emitting device EL emits light for a long time or displays a high grayscale, the temperature of the light-emitting device EL will rise (junction temperature rise), and the temperature rise will cause the reduction of the luminous efficiency of the light-emitting device. In a case where the light-emitting device switches to display the low grayscale, the actual luminous brightness may be lower than the set brightness (the brightness corresponding to the normal display state of the grayscale value), especially in a case where different light-emitting devices EL simultaneously switch to the same middle grayscale from different high grayscale and low grayscale, it may occur that the different light-emitting devices EL display the same grayscale but have different actual brightness, that is, the short-term afterimages problem. In the embodiments of the present disclosure, the first light-emitting sub-device EL1 may display the low grayscale, and the second light-emitting sub-device EL2 may display the high grayscale. That is, the high grayscale and the low grayscale may be realized by two different light-emitting sub-devices. Thus, the short-term afterimages problem caused by the junction temperature rise may be improved.

For example, in a case where the width-to-length ratio of the channel region of the first driving transistor DTFT1 is greater than the width-to-length ratio of the channel region of the second driving transistor DTFT2, under the action of the same control signal, the driving current output by the first driving transistor DTFT1 is greater than the driving current output by the second driving transistor DTFT2. Based on this, the first light-emitting sub-device EL1 may be set to display the high grayscale, and the second light-emitting sub-device EL2 may be set to display the low grayscale.

The light-emitting device EL (including the first light-emitting sub-device EL1 and the second light-emitting sub-device EL2) is a current-driven light emitting element. At a high current density, the luminous efficiency of the light-emitting device EL is high; and at a low current density, the luminous efficiency of the light-emitting device EL is low. Therefore, in some embodiments, an area of a light-emitting region of the first light-emitting sub-device EL1 is larger than an area of a light-emitting region of the second light-emitting sub-device EL2. In this way, the current density of the second light-emitting sub-device EL2 may increase, and the luminous efficiency of the second light-emitting sub-device EL2 may increase.

For example, the light-emitting area of the second light-emitting sub-device EL2 may be reduced by reducing the size of the opening of the second light-emitting sub-device EL2, or by reducing an area of the multi-quantum well layer of the second light-emitting sub-device EL2, or reducing an area of an electrode (P electrode) of the second light-emitting sub-device EL2, which is not specifically limited in the embodiments of the present disclosure.

In some embodiments, the plurality of light-emitting devices EL may include a red light-emitting device for emitting red light, a green light-emitting device for emitting green light, and a blue light-emitting device for emitting blue light. The luminous efficiency of the red light-emitting device may be greatly affected by the junction temperature. Based on this, the red light-emitting device EL-R includes the first light-emitting sub-device EL1 and the second light-emitting sub-device EL2, so that the luminous efficiency of the red light-emitting device may be improved, and the risk of short-term afterimages generated by the red light-emitting device may be reduced. In addition, the equivalent circuit diagram of the sub-pixel P corresponding to the red light-emitting device is shown in FIG. 11.

It can be understood that the luminous efficiencies of the green light-emitting device and the blue light-emitting device are less affected by the junction temperature. Therefore, each green light-emitting device may adopt a single light-emitting device, or may have a first light-emitting sub-device EL1 and a second light-emitting sub-device EL2; and each blue light-emitting device may adopt a single light-emitting device, or may have a first light-emitting sub-device EL1 and a second light-emitting sub-device EL2. In a case where the green light-emitting device and the blue light-emitting device each include a single light-emitting device, the equivalent circuit diagram of the corresponding sub-pixel is shown in FIG. 8.

In some embodiments, in order to further reduce the power consumption of the display panel 1100, the display panel 1100 further includes a plurality of cathode signal lines VSS insulated each other. The plurality of cathode signal lines VSS may transmit cathode voltage signals of different voltage values. The light-emitting devices EL for emitting different lights are electrically connected to different cathode signal lines VSS. Embodiments of the present disclosure do not specifically limit specific voltage values of cathode signals transmitted by different cathode signal lines.

For example, in a case where the light-emitting devices EL include a red light-emitting device, a green light-emitting device, and a blue light-emitting device, the display panel 1100 may include a first cathode signal line, a second cathode signal line, and a third cathode signal line (not shown in the figures). A plurality of red light-emitting devices are electrically connected to the first cathode signal line, a plurality of green light-emitting devices are electrically connected to the second cathode signal line, and a plurality of blue light-emitting devices are electrically connected to the third cathode signal line.

In some embodiments, as shown in FIG. 2, the display panel 1100 further includes a plurality of selection signal lines, for example, first selection signal lines DTL1 and second selection signal lines DTL2. Each selection signal line is electrically connected to a column of pixel circuits, and each column of pixel circuits is electrically connected to at least two selection signal lines. Each selection signal line serves as a selection signal terminal DT.

Figure 12:
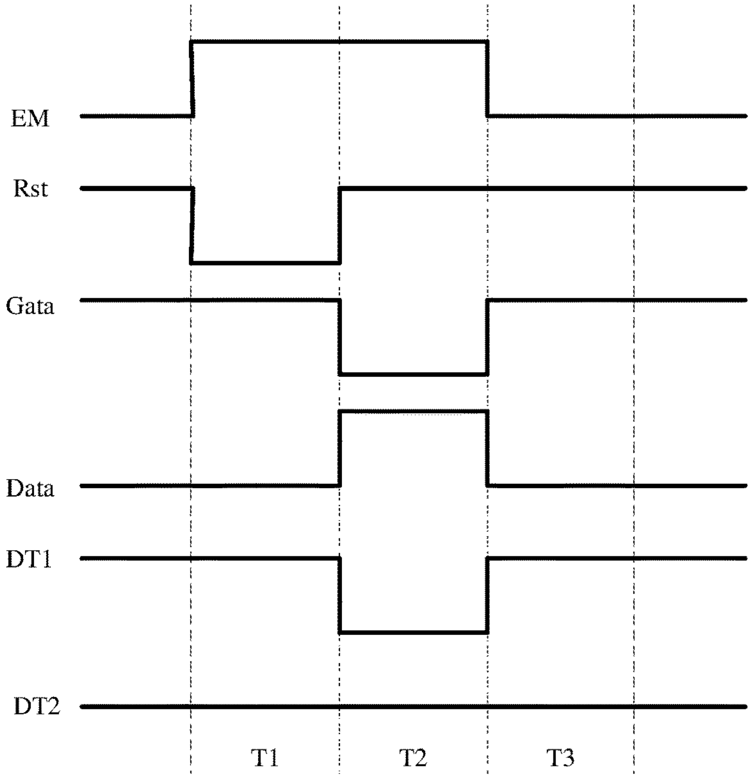
FIG. 12 is a control timing diagram of a pixel circuit, in accordance with some embodiments.

Some embodiments of the present disclosure provide a driving method for a pixel circuit, and the driving method is used to drive the pixel circuit 100 in any of the above embodiments. Referring to FIG. 12, a frame period may include an initialization phase T1, a scanning phase T2 and a light-emitting phase T3.

In the embodiments of the present disclosure, the driving method for the pixel circuit provided by the embodiment of the present disclosure is described in detail by considering the pixel circuit 100 shown in FIG. 8 or the pixel circuit 100 shown in FIG. 10 as an example. It can be understood that through adaptive adjustment, the driving method may be applied to other different pixel circuits provided by the embodiments of the present disclosure, which will not be listed one by one in the embodiments of the present disclosure. Referring to FIGS. 11 and 12, in some embodiments, the driving method includes the following contents.

In the initialization phase T1, the initialization signal terminal Rst outputs an operating voltage signal (a low-level voltage signal), and the other signal terminals (the light-emitting control signal terminal EM, the scanning signal terminal Gata, the data signal terminal Data, the first selection signal terminal DT1 and the second selection signal terminal DT2) each output a turn-off voltage signal (a high-level voltage signal).

The eighth transistor T80 and the ninth transistor T90 included in the initialization sub-circuit 60 are turned on, and the eighth transistor T80 and the ninth transistor T90 respectively transmit the second voltage signal from the second voltage signal terminal Vint to the control electrodes of the plurality of driving transistors DTFT and the anode of the light-emitting device EL, so as to initialize the control electrodes of the plurality of driving transistors DTFT and the anode of the light-emitting device EL, thereby wiping the voltage signals written into the corresponding nodes in the last frame period.

In the scanning phase T2, the scanning signal terminal Gata outputs an operating voltage, one of the plurality of selection signal terminals DT respectively electrically connected to the plurality of gating sub-circuits 10 outputs an operating voltage, and a remaining selection signal terminal outputs a turn-off voltage.

Synchronously, the data signal terminal Data outputs a data signal, and the scanning signal terminal Gata outputs the operating voltage. The fourth transistor T40 included in the data writing sub-circuit 20 and the fifth transistors T50 included in the compensation sub-circuits 40 are turned on. The data writing sub-circuit 20 and the compensation sub-circuits 40 transmit the data signal to the control electrodes of the plurality of driving transistors DTFT.

The scanning signal terminal Gata and one of the selection signal terminals DT output operating voltage signals, for example, the first selection signal terminal DT1 outputs an operating voltage signal. In this way, the first transistor T10 in the first gating sub-circuit 101 is turned on under the control of the scan signal from the scanning signal terminal Gata to transmit the first selection signal from the first selection signal terminal DT1 to the first node N10 of the first gating sub-circuit 101, and the second transistor T20 in the first gating sub-circuit 101 is turned on.

It can be understood that the scan signal simultaneously make the first transistor T10 in the second gating sub-circuit 102 turned on. However, since the second selection signal terminal DT2 outputs a turn-off voltage, the second transistor T20 in the second gating sub-circuit 102 remains turned off.

In this way, within a frame period, only one gating sub-circuit 10 (the first gating sub-circuit 101) is turned on, so that the light-emitting device EL displays the corresponding grayscale.

For example, in a case where the data signal terminal Data outputs a high grayscale data signal, the first selection signal terminal DT1 outputs an operating voltage signal, and the second selection signal terminal DT2 outputs a turn-off voltage signal; and in a case where the data signal terminal Data outputs a low grayscale data signal, the first selection signal terminal DT1 outputs a turn-off voltage signal, and the second selection signal terminal DT2 outputs an operating voltage signal.

In the light-emitting phase T3, the light-emitting control signal terminal EM outputs an operating voltage, and the fifth transistor T5 and the sixth transistor T6 are turned on. The pixel circuit 100 is turned-on, and the corresponding light-emitting device EL emits light.

For example, in a case where the data signal terminal Data outputs high grayscale data, the first selection signal terminal DT1 outputs an operating voltage, the second transistor T20 in the first gating sub-circuit 101 is turned on, and the first gating sub-circuit 101 transmits the driving current output by the first driving transistor DTFT1 to the first light-emitting sub-device EL1, so that the first light-emitting sub-device EL1 displays the high grayscale. Conversely, in a case where the data signal terminal Data outputs low grayscale data, the second gating sub-circuit 102 transmits the driving current output by the second driving transistor DTFT2 to the second light-emitting sub-device EL2, and the second light-emitting sub-device EL2 displays the low grayscale.

The foregoing descriptions are merely specific implementations of the present disclosure, but the protection scope of the present disclosure is not limited thereto. Any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. A pixel circuit, comprising:

a plurality of driving transistors, wherein the plurality of driving transistors are configured to output different driving currents under control of a received control signal;

a plurality of gating sub-circuits, wherein each gating sub-circuit is electrically connected to a respective selection signal terminal, a scanning signal terminal, a respective driving transistor and a light-emitting device node; the light-emitting device node is configured to be electrically connected to a light-emitting device, and the gating sub-circuit is configured to be turned on under control of a scanning signal from the scanning signal terminal and a selection signal from the selection signal terminal to transmit a driving current from the connected driving transistor to the light-emitting device, wherein within a frame period, one of a plurality of selection signal terminals respectively electrically connected to the plurality of gating sub-circuits outputs a selection signal;

a light-emitting control sub-circuit electrically connected to a light-emitting control signal terminal, a first voltage signal terminal, the plurality of driving transistors and the plurality of gating sub-circuits, and the light-emitting control sub-circuit being configured to create a path between each driving transistor and a respective gating sub-circuit under control of a light-emitting control signal from the light-emitting control signal terminal; and at least one initialization sub-circuit; each initialization sub-circuit being electrically connected to an initialization signal terminal, a second voltage signal terminal, a control electrode of at least one driving transistor and the light-emitting device node, and the initialization sub-circuit being configured to transmit a second voltage signal from the second voltage signal terminal to both a control electrode of the at least one driving transistor and the light-emitting device under control of an initialization signal from the initialization signal terminal.

2. The pixel circuit according to claim 1, wherein channel regions of the plurality of driving transistors have different width-to-length ratios.

3. The pixel circuit according to claim 1, wherein each gating sub-circuit is further electrically connected to the second voltage signal terminal; and the gating sub-circuit includes:

a first transistor, a control electrode of the first transistor being electrically connected to the scanning signal terminal, a first electrode of the first transistor being electrically connected to the selection signal terminal, and a second electrode of the first transistor being electrically connected to a first node;

a second transistor, a control electrode of the second transistor being electrically connected to the first node, a first electrode of the second transistor being electrically connected to the driving transistor, and a second electrode of the second transistor being electrically connected to the light-emitting device node; and a first capacitor, a first electrode plate of the first capacitor being electrically connected to the first node, and a second electrode plate of the first capacitor being electrically connected to the second voltage signal terminal.

4. The pixel circuit according to claim 1, further comprising:

a data writing sub-circuit electrically connected to the scanning signal terminal, a data signal terminal and control electrodes of the plurality of driving transistors, and the data writing sub-circuit being configured to transmit a data signal from the data signal terminal to the control electrodes of the plurality of driving transistors under control of the scanning signal.

5. The pixel circuit according to claim 4, wherein the data writing sub-circuit includes:

a third transistor, a control electrode of the third transistor being electrically connected to the scanning signal terminal, a first electrode of the third transistor being electrically connected to the data signal terminal, and a second electrode of the third transistor being electrically connected to the control electrodes of the plurality of driving transistors.

6. The pixel circuit according to claim 1, further comprising:

a data writing sub-circuit electrically connected to the scanning signal terminal, a data signal terminal and first electrodes of the plurality of driving transistors, and the data writing sub-circuit being configured to transmit a data signal from the data signal terminal to the first electrodes of the plurality of driving transistors under control of the scanning signal; and at least one compensation sub-circuit, each compensation sub-circuit being electrically connected to the scanning signal terminal, a second electrode of a driving transistor in the plurality of driving transistors and a control electrode of the at least one driving transistor, and the compensation sub-circuit being configured to transmit a voltage signal of the second electrode of the driving transistor to the control electrode of the at least one driving transistor under the control of the scanning signal.

7. The pixel circuit according to claim 6, wherein the at least one compensation sub-circuit includes a single compensation sub-circuit, and the single compensation sub-circuit is electrically connected to the second electrode of the driving transistor in the plurality of driving transistors and a control electrode of each driving transistor; or the at least one compensation sub-circuit includes a plurality of compensation sub-circuits, and each compensation sub-circuit is electrically connected to the second electrode of the driving transistor and a control electrode of the driving transistor.

8. The pixel circuit according to claim 6, wherein the data writing sub-circuit includes a fourth transistor; a control electrode of the fourth transistor is electrically connected to the scanning signal terminal, a first electrode of the fourth transistor is electrically connected to the data signal terminal, and a second electrode of the fourth transistor is electrically connected to the first electrodes of the plurality of driving transistors; and each compensation sub-circuit includes a fifth transistor; a control electrode of the fifth transistor is electrically connected to the scanning signal terminal, a first electrode of the fifth transistor is electrically connected to the second electrode of the driving transistor, and a second electrode of the fifth transistor is electrically connected to the control electrode of the at least one driving transistor.

9. The pixel circuit according to claim 1, wherein the at least one initialization sub-circuit includes a single initialization sub-circuit, and the single initialization sub-circuit is electrically connected to control electrodes of the plurality of driving transistors; or the at least one initialization sub-circuit includes a plurality of initialization sub-circuits, and each initialization sub-circuit is electrically connected to a control electrode of a driving transistor.

10. The pixel circuit according to claim 1, wherein the light-emitting control sub-circuit includes a sixth transistor and a plurality of seventh transistors; a control electrode of the sixth transistor is electrically connected to the light-emitting control signal terminal, a first electrode of the sixth transistor is electrically connected to the first voltage signal terminal, and a second electrode of the sixth transistor is electrically connected to first electrodes of the plurality of driving transistors; a control electrode of each seventh transistor is electrically connected to the light-emitting control signal terminal, a first electrode of each seventh transistor is electrically connected to a second electrode of a driving transistor, and a second electrode of each seventh transistor is electrically connected to a gating sub-circuit corresponding to the driving transistor;

each initialization sub-circuit includes an eighth transistor and a ninth transistor; a control electrode of the eighth transistor is electrically connected to the initialization signal terminal, a first electrode of the eighth transistor is electrically connected to the second voltage signal terminal, and a second electrode of the eighth transistor is electrically connected to the control electrode of the at least one driving transistor; a control electrode of the ninth transistor is electrically connected to the initialization signal terminal, a first electrode of the ninth transistor is electrically connected to the second voltage signal terminal, and a second electrode of the ninth transistor is electrically connected to the light-emitting device node.

11. The pixel circuit according to claim 1, wherein the plurality of driving transistors include a first driving transistor and a second driving transistor, and a width-to-length ratio of a channel region of the first driving transistor is greater than a width-to-length ratio of a channel region of the second driving transistor; and the plurality of gating sub-circuits include a first gating sub-circuit and a second gating sub-circuit, the first gating sub-circuit is electrically connected to a second electrode of the first driving transistor and configured to control the light-emitting device to display a first grayscale in a case where the first gating sub-circuit is turned on; the second gating sub-circuit is electrically connected to a second electrode of the second driving transistor and configured to control the light-emitting device to display a second grayscale in a case where the second gating sub-circuit is turned on; the first grayscale is greater than the second grayscale.

12. A display panel, comprising:

a plurality of pixel circuits each according to claim 1; and a plurality of light-emitting devices, each light-emitting device being electrically connected to a pixel circuit.

13. The display panel according to claim 12, wherein the pixel circuit includes a first gating sub-circuit and a second gating sub-circuit; and at least part of the plurality of light-emitting devices include a first light-emitting sub-device and a second light-emitting sub-device; the first gating sub-circuit is electrically connected to the first light-emitting sub-device, and is configured to control the first light-emitting sub-device to display a first grayscale; and the second gating sub-circuit is electrically connected to the second light-emitting sub-device, and is configured to control the second light-emitting sub-device to display a second grayscale.

14. The display panel according to claim 13, wherein the pixel circuit includes a first driving transistor and a second driving transistor; a width-to-length ratio of a channel region of the first driving transistor is greater than a width-to-length ratio of a channel region of the second driving transistor; the first gating sub-circuit is electrically connected to the first driving transistor, and the second gating sub-circuit is electrically connected to the second driving transistor; and an area of a light-emitting region of the first light-emitting sub-device is larger than an area of a light-emitting region of the second light-emitting sub-device.

15. The display panel according to claim 13, wherein the plurality of light-emitting devices include a red light-emitting device, and the red light-emitting device includes the first light-emitting sub-device and the second light-emitting sub-device.

16. The display panel according to claim 15, wherein the plurality of light-emitting devices further includes light-emitting devices for emitting light of other colors; and the display panel further comprises a plurality of cathode signal lines insulated each other; light-emitting devices for emitting light of a same color are electrically connected to a cathode signal line, and light-emitting devices for emitting light of different colors are electrically connected to different cathode signal lines.

17. The display panel according to claim 12, wherein the plurality of pixel circuits are arranged in a plurality of columns; and the display panel further comprises:

a plurality of selection signal lines, wherein each selection signal line is electrically connected to a column of pixel circuits, and each column of pixel circuits is electrically connected to at least two selection signal lines; and each selection signal line serves as a selection signal terminal.

18. A display apparatus, comprising the display panel according to claim 12.

19. A driving method for a pixel circuit, the driving method being used for driving the pixel circuit according to claim 1; a frame period including a scanning phase, and the driving method comprising:

in the scanning phase, the scanning signal terminal outputting an operating voltage, one of the plurality of selection signal terminals respectively electrically connected to the plurality of gating sub-circuits outputting an operating voltage, and the remaining selection signal terminals outputting turn-off voltages.

20. A pixel circuit, comprising:

a plurality of driving transistors, wherein the plurality of driving transistors are configured to output different driving currents under control of a received control signal;

a plurality of gating sub-circuits, wherein each gating sub-circuit is electrically connected to a respective selection signal terminal, a scanning signal terminal, a respective driving transistor and a light-emitting device node; the light-emitting device node is configured to be electrically connected to a light-emitting device, and the gating sub-circuit is configured to be turned on under control of a scanning signal from the scanning signal terminal and a selection signal from the selection signal terminal to transmit a driving current from the connected driving transistor to the light-emitting device, wherein within a frame period, one of a plurality of selection signal terminals respectively electrically connected to the plurality of gating sub-circuits outputs a selection signal;

a data writing sub-circuit electrically connected to the scanning signal terminal, a data signal terminal and first electrodes of the plurality of driving transistors, and the data writing sub-circuit being configured to transmit a data signal from the data signal terminal to the first electrodes of the plurality of driving transistors under control of the scanning signal; and at least one compensation sub-circuit, each compensation sub-circuit being electrically connected to the scanning signal terminal, a second electrode of a driving transistor in the plurality of driving transistors and a control electrode of at least one driving transistor, and the compensation sub-circuit being configured to transmit a voltage signal of the second electrode of the driving transistor to the control electrode of the at least one driving transistor under the control of the scanning signal.

* * * * *